(12) United States Patent
Mitsutani

(10) Patent No.: US 8,368,347 B2
(45) Date of Patent: Feb. 5, 2013

(54) VEHICULAR CHARGING SYSTEM

(75) Inventor: Noritake Mitsutani, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 90 days.

(21) Appl. No.: 13/131,782

(22) PCT Filed: Nov. 28, 2008

(86) PCT No.: PCT/JP2008/071603
§ 371 (c)(1),
(2), (4) Date: May 27, 2011

(87) PCT Pub. No.: WO2010/061465
PCT Pub. Date: Jun. 3, 2010

(65) Prior Publication Data
US 2011/0227534 A1 Sep. 22, 2011

(51) Int. Cl.
*H01M 10/48* (2006.01)
(52) U.S. Cl. ....................................................... 320/104
(58) Field of Classification Search .................. 320/104, 320/107, 132, 149; 324/425; 702/63, 64
See application file for complete search history.

(56) References Cited

U.S. PATENT DOCUMENTS

| | | | |
|---|---|---|---|
| 2010/0198440 A1* | 8/2010 | Fujitake | 701/22 |
| 2010/0285350 A1* | 11/2010 | Kao | 429/163 |
| 2010/0318250 A1* | 12/2010 | Mitsutani | 701/22 |
| 2011/0285350 A1* | 11/2011 | Mitsutani | 320/109 |

FOREIGN PATENT DOCUMENTS

| | | |
|---|---|---|
| JP | 5-207668 A | 8/1993 |
| JP | 6-253461 A | 9/1994 |
| JP | 8-106921 A | 4/1996 |
| JP | 08-228406 A | 9/1996 |
| JP | 2005-080318 A | 3/2005 |
| JP | 2007-273192 A | 10/2007 |
| JP | 2008-109840 A | 5/2008 |
| JP | 2008-265666 A | 11/2008 |

OTHER PUBLICATIONS

International Search Report mailed Feb. 17, 2009 of PCT/JP2008/071603.

Office Action issued Apr. 3, 2012 in JP 2010-540269 and English translation thereof.

* cited by examiner

*Primary Examiner* — Edward Tso
(74) *Attorney, Agent, or Firm* — Kenyon & Kenyon LLP

(57) ABSTRACT

A charging ECU causes a charger to perform quick charging until a state of charge of a power storage device reaches a predetermined state. The charging ECU causes the charger to perform additional charging during which charging progresses more slowly than the quick charging, when the state of charge comes closer to full charge than the predetermined state. The charging ECU stops charging of the power storage device by the charger when the state of charge of the power storage device reaches a charging stop threshold value during the additional charging, and stops charging of the power storage device by the charger when a time of the additional charging exceeds a predetermined time even if the state of charge of the power storage device does not reach the charging stop threshold value.

2 Claims, 6 Drawing Sheets

VEHICULAR CHARGING SYSTEM

This is a 371 national phase application of PCT/JP2008/071603 filed 28 Nov. 2008, the content of which is incorporated herein by reference.

FIELD OF THE INVENTION

The present invention relates to a vehicular charging system, and in particular, to a charging system for a vehicle provided with a power storage device configured to be chargeable from outside the vehicle.

BACKGROUND OF THE INVENTION

In electric vehicles and hybrid vehicles, mounting a plurality of power storage devices and extending the distance (EV drive distance) that can be traveled without operating an engine has been contemplated. When the plurality of power storage devices are mounted in this manner, how electric power is distributed among the respective power storage devices becomes a problem.

Japanese Patent Laying-Open No. 2008-109840 discloses a power supply system for a vehicle provided with a plurality of power storage devices. In this power supply system, a discharge share ratio calculation unit calculates remaining electric power quantities of the respective power storage devices before a state of charge (SOC) with respect to which the allowable discharge electric power is restricted is reached, and calculates the discharge power share ratio between the power storage devices according to the ratio between the remaining electric power quantities.

A charge share ratio calculation unit calculates chargeable quantities of the respective power storage devices before SOC with respect to which the allowable charge electric power is restricted is reached, and calculates the charge power share ratio between the power storage devices according to the ratio between the chargeable quantities. When electric power is supplied from the power supply system to a drive force generation unit, a plurality of converters are controlled according to the discharge power share ratio. When electric power is supplied from the drive force generation unit to the power supply system, the plurality of converters are controlled according to the discharge power share ratio.

Patent Document 1: Japanese Patent Laying-Open No. 2008-109840
Patent Document 2: Japanese Patent Laying-Open No. 5-207668
Patent Document 3: Japanese Patent Laying-Open No. 6-253461

SUMMARY OF THE INVENTION

Problems to be Solved by the Invention

In the electric vehicles, a vehicle-mounted power storage device is charged by being connected to a power supply outside the vehicle. In the hybrid vehicles as well having an engine and a motor used in combination as a motive power source, allowing a vehicle-mounted power storage device to be charged from outside the vehicle and performing plug-in charging has been contemplated in recent years.

When the power storage device is charged in this manner as in the electric vehicles and the plug-in chargeable hybrid vehicles, it is preferable to complete charging in the shortest possible time. In order to achieve both shortening the charging time and causing the power storage device to reach the state of charge as close to full charge as possible, it is also preferable to switch the charging mode during charging, such as, first performing charging by making full use of an upper limit value of electric power that can be output by an external power supply, and thereafter, slowly bringing the power storage device closer to the full charge state.

For example, there may be a method of first performing quick charging by constant electric power charging (referred to as "CP charging" hereinafter), and thereafter, performing charging during which the voltage provided to the power storage device is constant (referred to as "CV charging" hereinafter), or a method of, even in the case of performing the same CP charging, first performing CP charging with large electric power, and switching to CP charging with small electric power when charging progresses to some extent. Such charging methods are effective at avoiding overcharging.

In the plug-in hybrid vehicles, however, the total energy efficiency may become worse in the case where charging is continued than in the case where charging is stopped and the vehicle travels by consuming fuel, depending on losses during charging, various variations and the state of electric power consumed by an auxiliary machine during charging.

For example, a charger generally has a region where the efficiency of charging power is high. When electric power supplied to the power storage device at the time of charging becomes smaller with respect to the region, the charging efficiency is reduced. Therefore, in the plug-in hybrid vehicles as well, if charging continues too long with small charging power for avoiding overcharging, when the power storage device is brought closer to the full charge state, the energy efficiency may become higher in the case where the vehicle travels using the fuel than EV driving in which the vehicle travels using electric power charged by plug-in charging without using the engine.

In addition to the above, since the auxiliary machine consumes electric power that is not less than a certain value during plug-in charging, the relative efficiency is reduced when the charging power is small. Furthermore, due to variations in a sensor, a timing for determining stop of charging may shift and charging may be prolonged for a long time with low charging efficiency.

Japanese Patent Laying-Open No. 2008-109840 described above does not disclose problems of switching and using the different charging methods, specifically, quick charging followed by slow charging toward full charge, in such plug-in charging.

An object of the present invention is to provide a vehicular charging system having improved energy efficiency in a plug-in chargeable vehicle.

Means for Solving the Problems

In summary, the present invention is directed to a vehicular charging system charging a vehicle-mounted power storage device, including: a charger configured to be supplied with electric power from a power supply outside a vehicle to charge the power storage device; a sensor for detecting a state of charge of the power storage device; and a charging control device for controlling the charger. The charging control device causes the charger to perform quick charging until the state of charge of the power storage device reaches a predetermined state, and causes the charger to perform additional charging during which charging progresses more slowly than the quick charging, when the state of charge comes closer to full charge than the predetermined state. The charging control device stops charging of the power storage device by the charger when the state of charge of the power storage device reaches a charging stop threshold value during the additional charging, and stops charging of the power storage device by the charger when a time of the additional charging exceeds a predetermined time even if the state of charge of the power storage device does not reach the charging stop threshold value.

Preferably, the quick charging is charging during which the charger is controlled such that charging power is constant. The additional charging is charging during which the charger is controlled such that charging voltage supplied to the power storage device is constant.

Preferably, the vehicle includes a vehicle driving motor operated by receiving electric power from the power storage device, and an internal combustion engine used together with the motor to drive the vehicle.

In another aspect, the present invention is directed to a vehicular charging system charging a vehicle-mounted power storage device, including: a charger configured to be supplied with electric power from a power supply outside a vehicle to charge the power storage device; a sensor for detecting a state of charge of the power storage device; and a charging control device for controlling the charger. The charging control device stops charging of the power storage device from outside the vehicle when a predetermined stop condition is satisfied during charging of the power storage device from outside the vehicle. The charging control device calculates a first value based on an amount of electric energy required to charge the power storage device from a present state of charge to an upper limit value of the state of charge of the power storage device, in consideration of charging efficiency of the charger, and calculates a second value based on an amount of consumed fuel corresponding to a distance that can be traveled using the electric energy required to charge the power storage device from the present state of charge to the upper limit value of the state of charge of the power storage device. The stop condition includes a condition that the first value becomes larger than the second value.

Preferably, the vehicle includes a vehicle driving motor operated by receiving electric power from the power storage device, and an internal combustion engine used together with the motor to drive the vehicle.

Effects of the Invention

According to the present invention, charging the power storage device when the energy efficiency is low can be suppressed.

DESCRIPTION OF THE REFERENCE SIGNS

Figure 1:
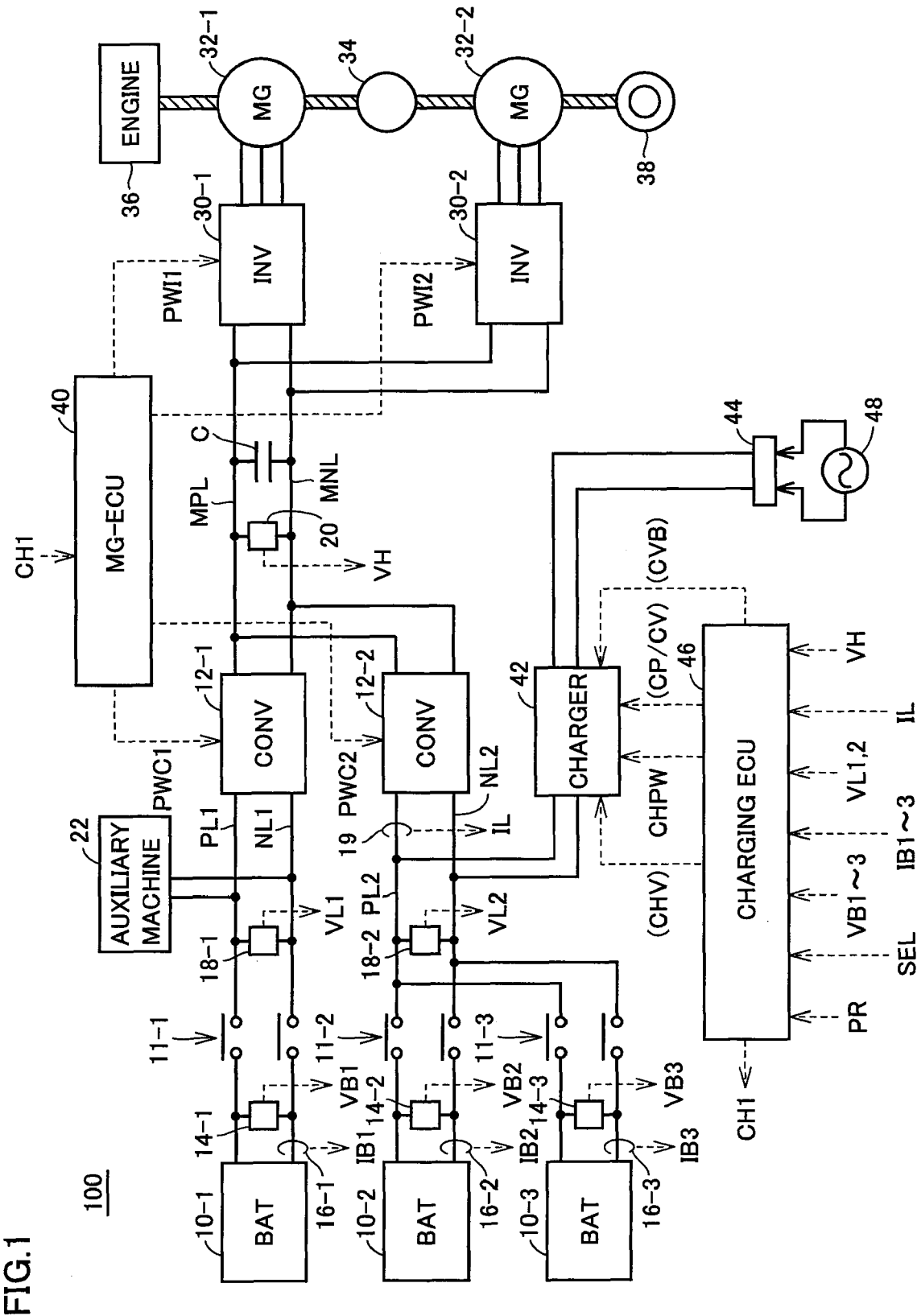
FIG. 1 is an overall block diagram of a hybrid vehicle shown as one example of an electric powered vehicle according to the present invention.

10-1 to 10-3 power storage device; 11-1 to 11-3 system main relay; 12-1, 12-2 converter; 13 chopper circuit; 14-1 to 14-3, 18-1, 18-2, 20, 91, 93, 94 voltage sensor; 16-1 to 16-3, 19, 92, 95 current sensor; 22 auxiliary machine, 30-1, 30-2 inverter; 32-1, 32-2 motor generator; 34 power split device; 36 engine; 38 driving wheel; 42 charger; 44 vehicle inlet; 46 charging ECU; 48 power supply; 81 filter; 82 AC/DC converting unit; 83, C, C1 smoothing capacitor; 84 DC/AC converting unit; 85 insulating transformer; 86 rectifying unit; 88 microcomputer; 100 vehicle; D1A, D1B diode; L1 inductor; LN1A positive bus; LN1B wiring; LN1C negative bus; MNL main negative bus; MPL main positive bus; NL1, NL2, NLC negative electrode line; PL1, PL2, PLC positive electrode line; Q1A, Q1B switching element

DETAILED DESCRIPTION

Embodiments of the present invention will be described in detail hereinafter with reference to the drawings, in which the same or corresponding portions are denoted with the same reference characters and description thereof will not be repeated.

[First Embodiment]

FIG. 1 is an overall block diagram of a hybrid vehicle shown as one example of an electric powered vehicle according to the present invention.

Referring to FIG. 1, a hybrid vehicle 100 includes power storage devices 10-1 to 10-3, system main relays 11-1 to 11-3, converters 12-1 and 12-2, a main positive bus MPL, a main negative bus MNL, a smoothing capacitor C, and an auxiliary machine 22. In addition, hybrid vehicle 100 further includes inverters 30-1 and 30-2, motor generators 32-1 and 32-2, a power split device 34, an engine 36, and a driving wheel 38. Furthermore, hybrid vehicle 100 includes voltage sensors 14-1 to 14-3, 18-1, 18-2 and 20, current sensors 16-1 to 16-3 and 19, and an MG-ECU (Electronic Control Unit) 40. Moreover, hybrid vehicle 100 includes a charger 42, a vehicle inlet 44 and a charging ECU 46.

Each of power storage devices 10-1 to 10-3 is a rechargeable DC power supply and includes, for example, a secondary battery such as a nickel-metal hydride battery and a lithium ion battery, a capacitor of large capacitance and the like. Power storage device 10-1 is connected to converter 12-1 with system main relay 11-1 interposed therebetween, and power storage devices 10-2 and 10-3 are connected to converter 12-2 with system main relays 11-2 and 11-3 interposed therebetween, respectively.

System main relay 11-1 is provided between power storage device 10-1 and converter 12-1. System main relay 11-2 is provided between power storage device 10-2 and converter 12-2, and system main relay 11-3 is provided between power storage device 10-3 and converter 12-2. In order to avoid a short circuit in power storage device 10-2 and power storage device 10-3, system main relays 11-2 and 11-3 are selectively turned on and are never turned on simultaneously.

Converters 12-1 and 12-2 are connected to main positive bus MPL and main negative bus MNL in parallel with each other. Converter 12-1 makes voltage conversion between power storage device 10-1 and main positive and negative buses MPL and MNL, based on a signal PWC1 from MG-ECU 40. Converter 12-2 makes voltage conversion between any one of power storage device 10-2 and power storage device 10-3 electrically connected to converter 12-2 and main positive and negative buses MPL and MNL, based on a signal PWC2 from MG-ECU 40.

Auxiliary machine 22 is connected to a positive electrode line PL1 and a negative electrode line NL1 arranged between system main relay 11-1 and converter 12-1. Smoothing capacitor C is connected between main positive bus MPL and main negative bus MNL, and reduces an electric power fluctuation component included in main positive bus MPL and main negative bus MNL.

Inverters 30-1 and 30-2 are connected to main positive bus MPL and main negative bus MNL in parallel with each other. Inverter 30-1 drives motor generator 32-1 based on a signal PWI1 from MG-ECU 40. Inverter 30-2 drives motor generator 32-2 based on a signal PWI2 from MG-ECU 40.

Motor generators 32-1 and 32-2 are AC rotating electric machines and are, for example, permanent magnet type synchronous motors including a rotor having a permanent magnet embedded therein. Motor generators 32-1 and 32-2 are coupled to power split device 34. Power split device 34 includes a planetary gear including a sun gear, a pinion gear, a carrier, and a ring gear. The pinion gear engages the sun gear and the ring gear. The carrier supports the pinion gear such that the pinion gear can rotate on its axis, and is coupled to a crankshaft of engine 36. The sun gear is coupled to a rotation shaft of motor generator 32-1. The ring gear is coupled to a rotation shaft of motor generator 32-2 and driving wheel 38. This power split device 34 divides motive power generated by engine 36 into a path through which the motive power is transmitted to driving wheel 38 and a path through which the motive power is transmitted to motor generator 32-1.

Motor generator 32-1 generates electric power using the motive power of engine 36 divided by power split device 34. For example, when the SOCs of power storage devices 10-1 to 10-3 decrease, engine 36 starts, motor generator 32-1 generates electric power and the generated electric power is supplied to the power storage devices.

On the other hand, motor generator 32-2 generates driving force using at least one of the electric power supplied from at least one of power storage devices 10-1 to 10-3 and the electric power generated by motor generator 32-1. The driving force of motor generator 32-2 is transmitted to driving wheel 38. At the time of braking of the vehicle, kinetic energy of the vehicle is transmitted from driving wheel 38 to motor generator 32-2 to drive motor generator 32-2, and motor generator 32-2 functions as a generator. As a result, motor generator 32-2 functions as a regenerative brake for converting the kinetic energy of the vehicle to electric power and recovering the electric power.

MG-ECU 40 generates signals PWC1 and PWC2 for driving converters 12-1 and 12-2, respectively, and outputs generated signals PWC1 and PWC2 to converters 12-1 and 12-2, respectively. In addition, MG-ECU 40 generates signals PWI1 and PWI2 for driving motor generators 32-1 and 32-2, respectively, and outputs generated signals PWI1 and PWI2 to inverters 30-1 and 30-2, respectively.

In addition, when a signal CH1 received from charging ECU 46 is rendered active at the time of charging of power storage device 10-1 by charger 42, MG-ECU 40 generates signals PWC 1 and PWC2 such that charging power is sequentially supplied from charger 42 through converter 12-2, main positive bus MPL, main negative bus MNL, and converter 12-1 to power storage device 10-1, and outputs generated signals PWC1 and PWC2 to converters 12-1 and 12-2, respectively.

Charger 42 has an input end connected to vehicle inlet 44 and an output end connected to a positive electrode line PL2 and a negative electrode line NL2 arranged between system main relays 11-2, 11-3 and converter 12-2. Charger 42 receives, from vehicle inlet 44, electric power supplied from a power supply 48 outside the vehicle (also referred to as "external power supply" hereinafter). Charger 42 receives an electric power command value CHPW from charging ECU 46, and controls the output electric power of charger 42 such that the output electric power matches electric power command value CHPW, while controlling the output voltage of charger 42 to a predetermined DC voltage. Vehicle inlet 44 is an electric power interface for receiving the electric power from external power supply 48.

Voltage sensors 14-1 to 14-3 detect a voltage VB1 of power storage device 10-1, a voltage VB2 of power storage device 10-2 and a voltage VB3 of power storage device 10-3, respectively, and output the detected values to charging ECU 46. Current sensors 16-1 to 16-3 detect a current IB1 input and output to/from power storage device 10-1, a current IB2 input and output to/from power storage device 10-2, and a current IB3 input and output to/from power storage device 10-3, respectively, and output the detected values to charging ECU 46.

Voltage sensors 18-1 and 18-2 detect a voltage VL1 between positive electrode line PL1 and negative electrode line NL1 as well as a voltage VL2 between positive electrode line PL2 and negative electrode line NL2, respectively, and output the detected values to charging ECU 46. Current sensor 19 detects a current IL of positive electrode line PL2 input and output to/from converter 12-2, and outputs the detected value to charging ECU 46. When charger 42 charges power storage device 10-1, this current sensor 19 can detect a current flowing from charger 42 to converter 12-2. Voltage sensor 20 detects a voltage VH between main positive bus MPL and main negative bus MNL, and outputs the detected value to charging ECU 46.

At the time of charging of power storage devices 10-1 to 10-3 by external power supply 48 connected to vehicle inlet 44, charging ECU 46 receives a target value PR of the charging power (kW/h) of power storage devices 10-1 to 10-3 from a not-shown vehicle ECU. In addition, charging ECU 46 receives, from the above vehicle ECU, a signal SEL indicating which of power storage devices 10-1 to 10-3 is charged by charger 42. In other words, in this first embodiment, power storage devices 10-1 to 10-3 are charged sequentially in a predetermined order.

When power storage device 10-1 is charged, signal CH1 is output from charging ECU 46 to MG-ECU 40 and converters 12-1 and 12-2 operate such that electric power sequentially flows from charger 42 through converter 12-2 and converter 12-1 to power storage device 10-1. Here, when power storage device 10-1 is charged, auxiliary machine 22 connected between power storage device 10-1 and converter 12-1 operates using electric power supplied from charger 42. On the other hand, when power storage device 10-2 or power storage device 10-3 is charged, auxiliary machine 22 is supplied with electric power from power storage device 10-1.

At the time of charging of power storage devices 10-1 to 10-3 by external power supply 48, charging ECU 46 generates electric power command value CHPW indicating the target value of the output electric power of charger 42, and outputs generated electric power command value CHPW to charger 42. In addition, charging ECU 46 outputs a signal CP/CV indicating the charging mode to charger 42. Signal CP/CV is a signal for providing an instruction to switch the charging mode between a constant electric power charging (CP) charging mode and a constant voltage charging (CV) charging mode. CHV indicates a target voltage at this time and CVB indicates the voltage of a battery to be controlled. It is to be noted that signal CP/CV may be a signal for providing an instruction to switch the charging power from a large value to a small value, and in this case, electric power command value CHPW can only suffice. In the case of CV charging as well, a method for varying electric power command value CHPW while monitoring the battery voltage by the charging ECU may be adopted.

Charging ECU 46 receives respective detected values of voltages VB1 to VB3, VL1, VL2, and VH as well as currents IB1 to I33 and IL, and makes feedback correction to electric power command value CHPW of charger 42 based on the above respective detected values such that the charging power actually supplied to power storage devices 10-1 to 10-3 matches target value PR. In other words, in this first embodiment, not only is charger 42 controlled such that the output electric power of charger 42 matches the target value, but also is feedback correction made to electric power command value CHPW based on the state of the power storage devices such that the actual charging power of the power storage devices matches the target value. As a result, reliable matching between the charging power of power storage devices 10-1 to 10-3 and target value PR can be achieved.

Figure 2:
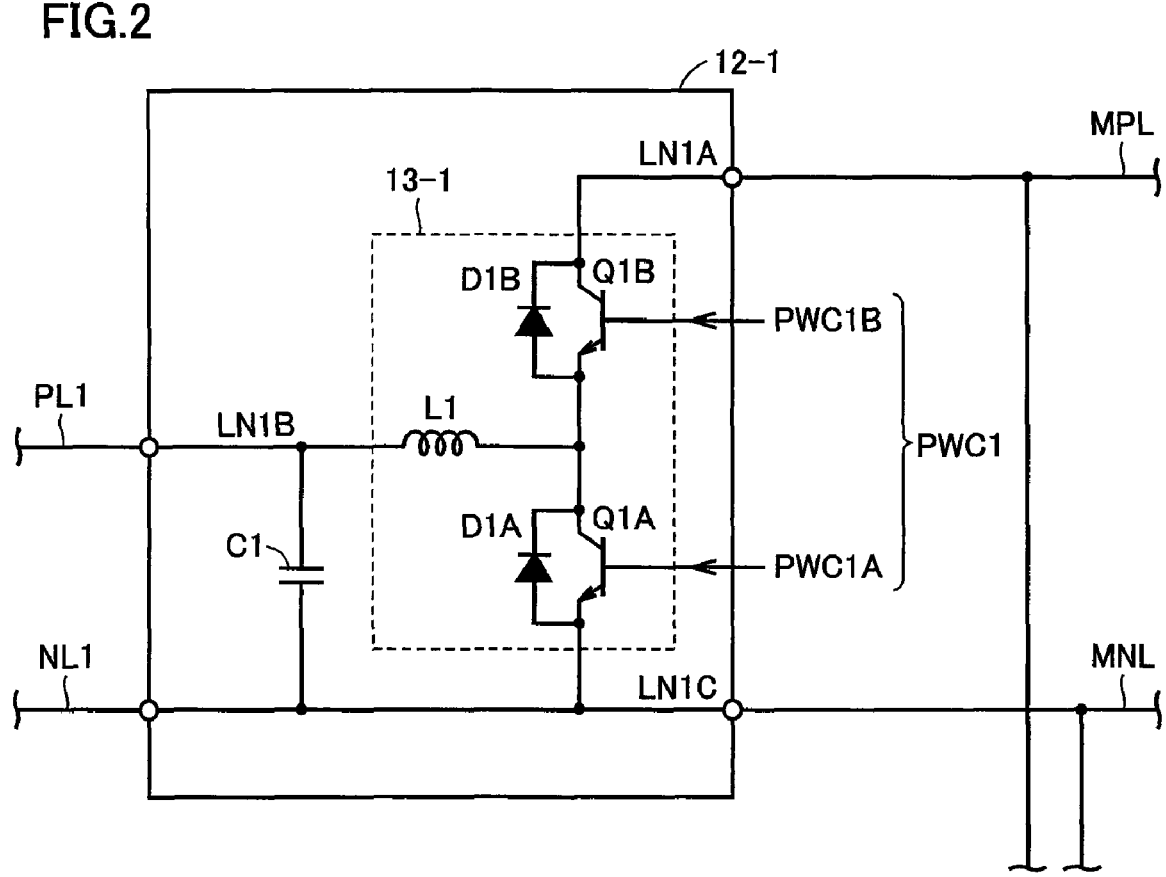
FIG. 2 is a schematic configuration diagram of converters 12-1 and 12-2 shown in FIG. 1.

FIG. 2 is a schematic configuration diagram of converters 12-1 and 12-2 shown in FIG. 1. Since the configuration and operation of each converter are similar, the configuration and operation of converter 12-1 will be described hereinafter as a typical example.

Referring to FIG. 2, converter 12-1 includes a chopper circuit 13-1, a positive bus LN1A, a negative bus LN1C, a wiring LN1B, and a smoothing capacitor C1. Chopper circuit 13-1 includes switching elements Q1A and Q1B, diodes D1A and D1B, and an inductor L1.

Positive bus LN1A has one end connected to a collector of switching element Q1B, and the other end connected to main positive bus MPL. Negative bus LN1C has one end connected to negative electrode line NL1, and the other end connected to main negative bus MNL.

Switching elements Q1A and Q1B are serially connected between negative bus LN1C and positive bus LN1A. Specifically, an emitter of switching element Q1A is connected to negative bus LN1C and the collector of switching element Q1B is connected to positive bus LN1A. Diodes D1A and D1B are connected in antiparallel with switching elements Q1A and Q1B, respectively. Inductor L1 is connected between wiring LN1B and a connection node of switching elements Q1A and Q1B.

Wiring LN1B has one end connected to positive electrode line PL1, and the other end connected to inductor L1. Smoothing capacitor C1 is connected between wiring LN1B and negative bus LN1C, and reduces an AC component included in the DC voltage between wiring LN1B and negative bus LN1C.

In response to signal PWC1 from MG-ECU 40 (FIG. 1), chopper circuit 13-1 makes bidirectional conversion of the DC voltage between power storage device 10-1 (FIG. 1) and main positive and negative buses MPL and MNL. Signal PWC1 includes a signal PWC1A for controlling ON/OFF of switching element Q1A that constitutes a lower arm element, and a signal PWC1B for controlling ON/OFF of switching element Q1B that constitutes an upper arm element. MG-ECU 40 controls the duty ratio (the ratio between the ON time period and the OFF time period) of switching elements Q1A and Q1B in a constant duty cycle (the sum of the ON time period and the OFF time period).

When switching elements Q1A and Q1B are controlled such that the ON duty of switching element Q1A becomes large (since switching elements Q1A and Q1B are subjected to ON/OFF control in a complementary manner except for the dead time period, the ON duty of switching element Q1B becomes small), an amount of pump current flowing from power storage device 10-1 to inductor L1 increases and the electromagnetic energy accumulated in inductor L1 increases. Consequently, an amount of current discharged from inductor L1 through diode D1B to main positive bus MPL at a timing at which switching element Q1A undergoes transition from the ON state to the OFF state increases, and the voltage of main positive bus MPL rises.

On the other hand, when switching elements Q1A and Q1B are controlled such that the ON duty of switching element Q1B becomes large (the ON duty of switching element Q1A becomes small), an amount of current flowing from main positive bus MPL through switching element Q1B and inductor L1 to power storage device 10-1 increases, and the voltage of main positive bus MPL drops.

By controlling the duty ratio of switching elements Q1A and Q1B in this manner, the voltage of main positive bus MPL can be controlled, and the direction of current (electric power) and the amount of current (the amount of electric power) flowing between power storage device 10-1 and main positive bus MPL can also be controlled.

Figure 3:
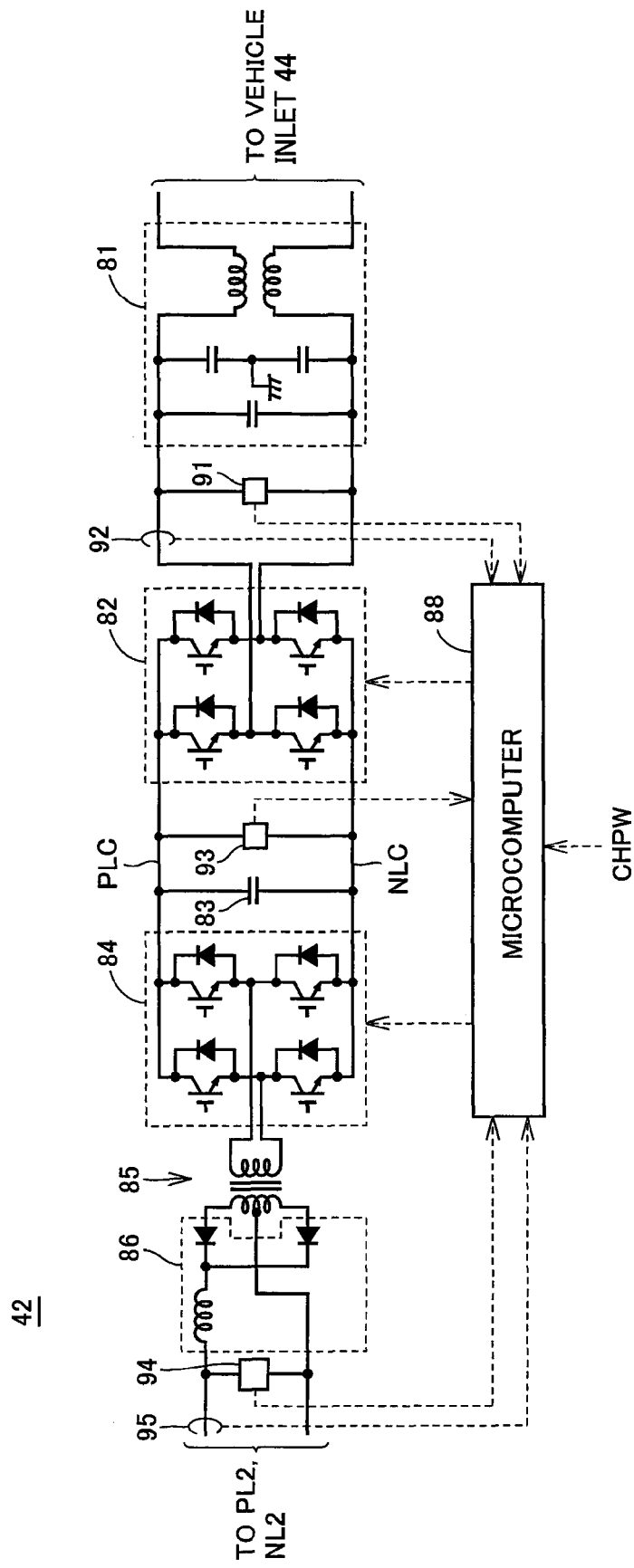
FIG. 3 is a schematic configuration diagram of a charger 42 shown in FIG. 1.

FIG. 3 is a schematic configuration diagram of charger 42 shown in FIG. 1.

Referring to FIG. 3, charger 42 includes a filter 81, voltage sensors 91, 93 and 94, current sensors 92 and 95, and a microcomputer 88.

Charger 42 further includes an AC/DC converting unit 82, a smoothing capacitor 83, a DC/AC converting unit 84, an insulating transformer 85, and a rectifying unit 86.

Filter 81 is provided between vehicle inlet 44 (FIG. 1) and AC/DC converting unit 82, and prevents output of high-frequency noise from vehicle inlet 44 to external power supply 48 at the time of charging of power storage devices 10-1 to 10-3 by external power supply 48 (FIG. 1). AC/DC converting unit 82 includes a single-phase bridge circuit. AC/DC converting unit 82 converts AC electric power supplied from external power supply 48 to DC electric power based on a drive signal from microcomputer 88, and outputs the DC electric power to a positive electrode line PLC and a negative electrode line NLC. Smoothing capacitor 83 is connected between positive electrode line PLC and negative electrode line NLC, and reduces an electric power fluctuation component included between positive electrode line PLC and negative electrode line NLC.

DC/AC converting unit 84 includes a single-phase bridge circuit. DC/AC converting unit 84 converts DC electric power supplied from positive electrode line PLC and negative electrode line NLC to high-frequency AC electric power based on the drive signal from microcomputer 88, and outputs the AC electric power to insulating transformer 85. Insulating transformer 85 includes a core containing a magnetic material, as well as a primary coil and a secondary coil wound around the core. The primary coil and the secondary coil are electrically insulated and are connected to DC/AC converting unit 84 and rectifying unit 86, respectively. Insulating transformer 85 converts the high-frequency AC electric power received from DC/AC converting unit 84 to the voltage level corresponding to the winding ratio of the primary coil and the secondary coil, and outputs the electric power to rectifying unit 86. Rectifying unit 86 rectifies the AC electric power output from insulating transformer 85 to DC electric power, and outputs the DC electric power to positive electrode line PL2 and negative electrode line NL2.

Voltage sensor 91 detects the voltage of external power supply 48 after filter 81, and outputs the detected value to microcomputer 88. Current sensor 92 detects the current supplied from external power supply 48, and outputs the detected value to microcomputer 88. Voltage sensor 93 detects the voltage between positive electrode line PLC and negative electrode line NLC, and outputs the detected value to microcomputer 88. Voltage sensor 94 detects the voltage on the output side of rectifying unit 86, and outputs the detected value to microcomputer 88. Current sensor 95 detects the current output from rectifying unit 86, and outputs the detected value to microcomputer 88.

Microcomputer 88 generates the drive signals for driving AC/DC converting unit 82 and DC/AC converting unit 84, based on the respective values detected by voltage sensors 91, 93 and 94 as well as current sensors 92 and 95, such that the output electric power of charger 42 calculated based on the values detected by voltage sensor 94 and current sensor 95 matches electric power command value CHPW. Then, microcomputer 88 outputs the generated drive signals to AC/DC converting unit 82 and DC/AC converting unit 84.

As described above, the charging system described in the present embodiment is configured such that the voltage sensors and the current sensors can sense the state of charge (SOC) in the plug-in hybrid vehicle. The charging mode is switched between quick charging and additional charging. Charger 42 can adjust the charging power based on electric power command value CHPW from charging ECU 46 mounted on the vehicle. In addition, charger 42 can switch the charging mode between a low electric power charging mode (CP mode) and a low voltage charging mode (CV mode) in accordance with the instruction from charging ECU 46.

Control performed by charging ECU 46 will be described hereinafter.

Figure 4:
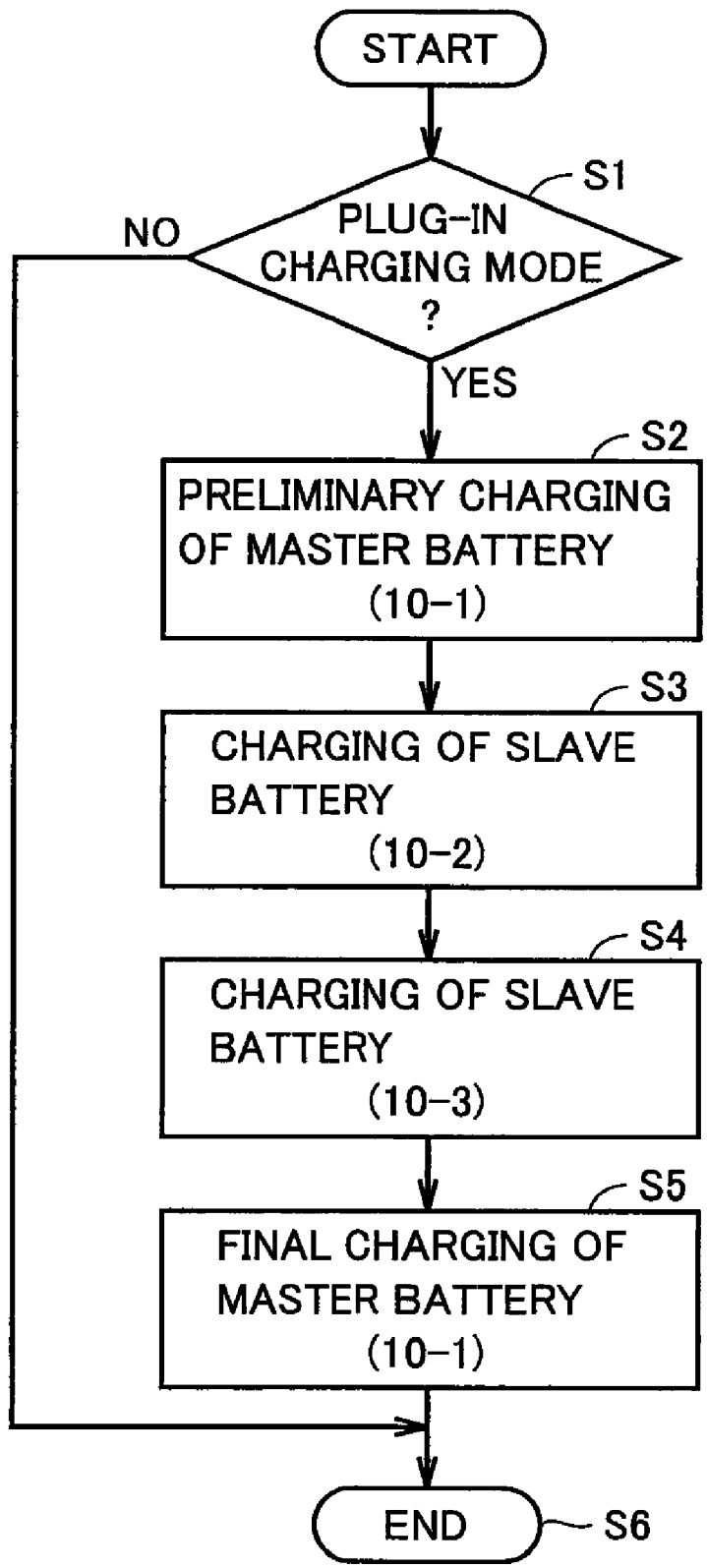
FIG. 4 is a flowchart showing a main routine of charging control performed by a charging ECU 46 in FIG. 1.

FIG. 4 is a flowchart showing a main routine of charging control performed by charging ECU 46 in FIG. 1.

Referring to FIGS. 1 and 4, first, in step S1, charging ECU 46 determines whether or not the operation mode of the vehicle is a plug-in charging mode.

When insertion of a power supply plug into vehicle inlet 44 or application of the voltage from power supply 48 to charger 42, for example, is detected, charging ECU 46 recognizes that the vehicle is in the plug-in charging mode. If the vehicle is not in the plug-in charging mode in step S1, the process proceeds to step S6 and the charging operation ends. On the other hand, if charging ECU 46 recognizes in step S1 that the vehicle is in the plug-in charging mode, the process proceeds to step S2.

In step S2, power storage device 10-1 serving as a master battery is charged preliminarily. For this preliminary charging, system main relay 11-1 is set to the ON state. In addition, system main relay 11-2 and system main relay 11-3 are controlled to the OFF state. Then, charger 42 receives electric power from external power supply 48 and power storage device 10-1 is charged with the electric power transmitted via voltage converters 12-2 and 12-1. Until a predetermined time or a predetermined state of charge is reached, switching elements Q1B and Q1A are both controlled to the OFF state in converter 12-2 and a current flows toward converter 12-1 via diode D1B. In converter 12-1, switching element Q1B is controlled to the ON state and switching element Q1A is controlled to the OFF state. As a result, the electric power from charger 42 is supplied toward power storage device 10-1.

When the state of charge of power storage device 10-1 reaches the predetermined state or charging for the predetermined time is completed, power storage device 10-2 serving as a slave battery is charged in step S3. At this time, system main relay 11-1 is controlled to the ON state and the electric power is supplied from first power storage device 10-1 to auxiliary machine 22 including various types of ECUs. In addition, system main relay 11-2 is controlled to the ON state and system main relay 11-3 is controlled to the OFF state. As a result, the electric power from external power supply 48 is supplied to power storage device 10-2 via charger 42.

When a condition for completing charging of power storage device 10-2 is satisfied, the process proceeds from step S3 to step S4 and another power storage device 10-3 serving as a slave battery is charged. At this time, system main relay 11-2 is controlled to the OFF state whereas system main relay 11-3 is controlled to the ON state such that power storage device 10-2 is disconnected and power storage device 10-3 is connected. Then, the electric power from external power supply 48 is supplied to third power storage device 10-3 through charger 42. When a predetermined condition for ending charging is satisfied, the process proceeds from step S4 to step S5 and final charging of power storage device 10-1 serving as the master battery is performed. In step S5, the state of charge recovers, which has decreased because the electric power has been supplied to auxiliary machine 22 during charging in steps S3 and S4. When a condition for completing charging of power storage device 10-1 is satisfied, the process proceeds from step S5 to step S6 and plug-in charging is completed.

Figure 5:
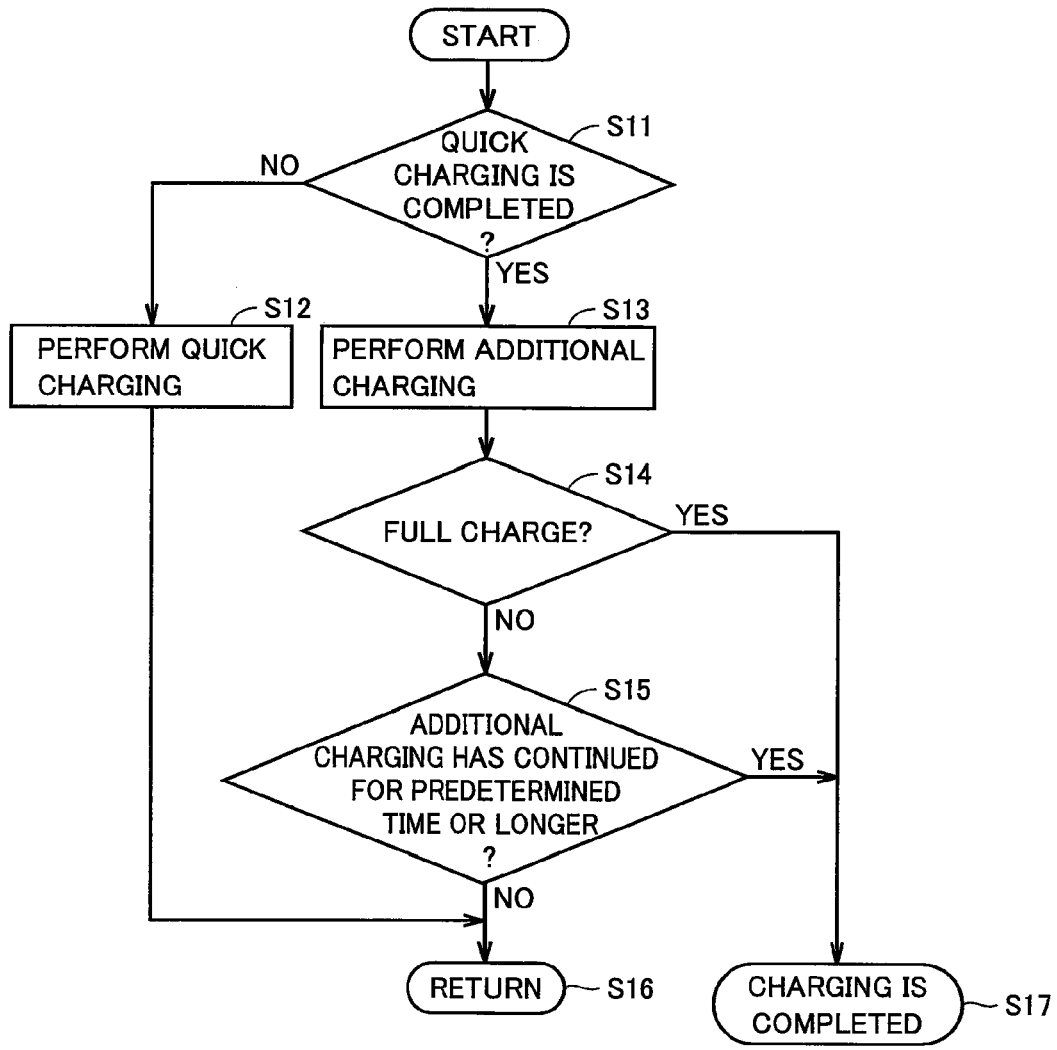
FIG. 5 is a flowchart for describing in detail charging processing executed in step S3 in FIG. 4.

FIG. 5 is a flowchart for describing in detail charging processing executed in step S3 in FIG. 4. It is to be noted that this charging processing may also be executed in steps S4 and S5 in FIG. 4. In addition, this charging completion determination processing can be used to determine completion of charging in not only the configuration having a plurality of power storage devices as shown in FIG. 1 but also various plug-in hybrid vehicles.

Referring to FIG. 5, when the process starts, it is first determined in step S11 whether or not quick charging is completed. A condition for this determination of completion of quick charging may be a condition that the voltage of a power storage device to be charged has become a predetermined value or larger, or a condition that state of charge SOC calculated based on the voltage and the current has become larger than a predetermined value.

If it is determined in step S11 that quick charging is not completed, quick charging is performed in step S12. Then, the process proceeds to step S16 and control returns to the main routine. In this case, determination of quick charging and charging are repeated again in step S11.

On the other hand, if it is determined in step S11 that quick charging is completed, the process proceeds to step S13. In step S13, additional charging is performed.

Figure 6:
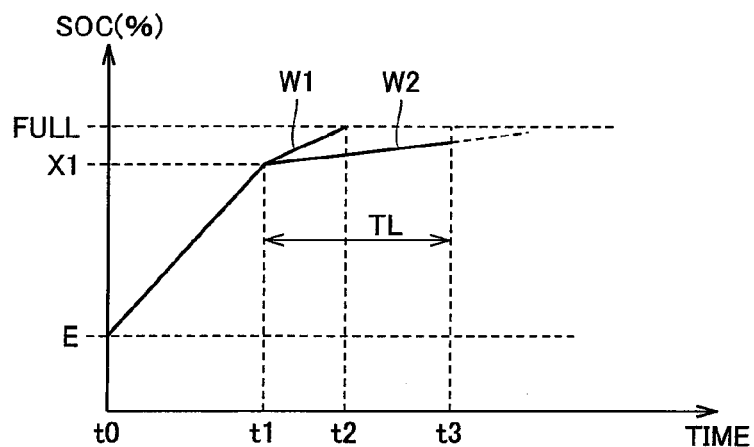
FIG. 6 shows changes in the state of charge in quick charging and additional charging.

FIG. 6 shows changes in the state of charge in quick charging and additional charging.

Referring to FIG. 6, during times t0 to t1, quick charging in step S12 in FIG. 5 is performed. A threshold value X1 is set to be a value somewhat close to a full charge determination value FULL.

At time t1, when state of charge SOC reaches threshold value X1, it is determined that quick charging in step S11 is completed. After time t1, additional charging in step S13 is performed. During additional charging herein, charging progresses more slowly than quick charging. This is to prevent overcharging, for example.

Subsequently, it is determined in step S14 whether or not a power storage device to be charged is in the full charge state. This determination of full charge is made based on a state of charge threshold value FULL corresponding to full charge in FIG. 6. When electric power consumed by the auxiliary machine exceeds progress of the state of charge by additional charging, charging progresses only very slowly and charging progresses as shown by a waveform W2. On the other hand, when a small amount of electric power is consumed by the auxiliary machine, the power storage device reaches the full charge state in a relatively short time as shown by a waveform W1.

When charging progresses as shown by waveform W1, state of charge SOC reaches threshold value FULL at time t2. Therefore, the process proceeds from step S14 to step S17 and charging of the power storage device to be charged is completed. On the other hand, when charging progresses only very slowly as shown by waveform W2, the process proceeds from step S14 to step S15 and it is determined whether or not additional charging has continued for a predetermined time or longer. This predetermined time corresponds to a time TL shown in FIG. 6.

If additional charging has continued for predetermined time TL or longer in step S15, the process proceeds from step S15 to step S17 and charging of the power storage device to be charged is completed at time t3 in FIG. 6. On the other hand, if it is not determined in step S14 that the power storage device is in the full charge state and if additional charging does not continue for the predetermined time or longer in step S15, this determination of completion of charging is made again and additional charging continues.

For example, quick charging herein can be constant electric power charging (CP charging), and additional charging herein can be constant voltage charging (CV charging). Additional charging can also be CP charging. In this case, additional charging can be CP charging with a smaller amount of electric power than electric power at the time of quick charging.

Figure 7:
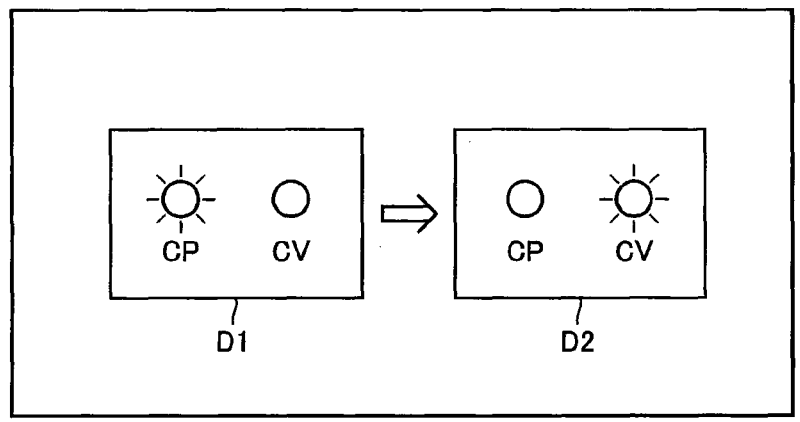
FIG. 7 shows an example of a display unit displaying the states in which quick charging and additional charging are performed.

FIG. 7 shows an example of a display unit displaying the states in which quick charging and additional charging are performed.

As shown by a display unit D1 in FIG. 7, a lamp indicated with "CP" lights up and a lamp indicated with "CV" goes out during quick charging. When transition to additional charging is made, the lamp indicated with "CV" lights up and the lamp indicated with "CP" goes out as shown by a display unit D2. When charging is completed, both lamps go out.

With such a configuration, an operator can be informed of whether quick charging is currently performed, additional charging is currently performed or charging is completed. It is to be noted that the light up color of one LED lamp may change, or a liquid crystal display device may display the charging mode. This display may be provided at some place in the vehicle, or charging ECU 46 may send the charging mode to a charging station outside the vehicle via communication to cause the charging station outside the vehicle to display the charging mode.

As described above, in the first embodiment, charging can be ended when full charge is not reached even if additional charging is performed for a certain time or longer, and waste of energy due to low charging efficiency can be suppressed.

[Second Embodiment]

In a second embodiment, it is further determined when to complete charging, by comprehensively determining a relationship between the charging efficiency and the amount of energy that can be charged.

Figure 8:
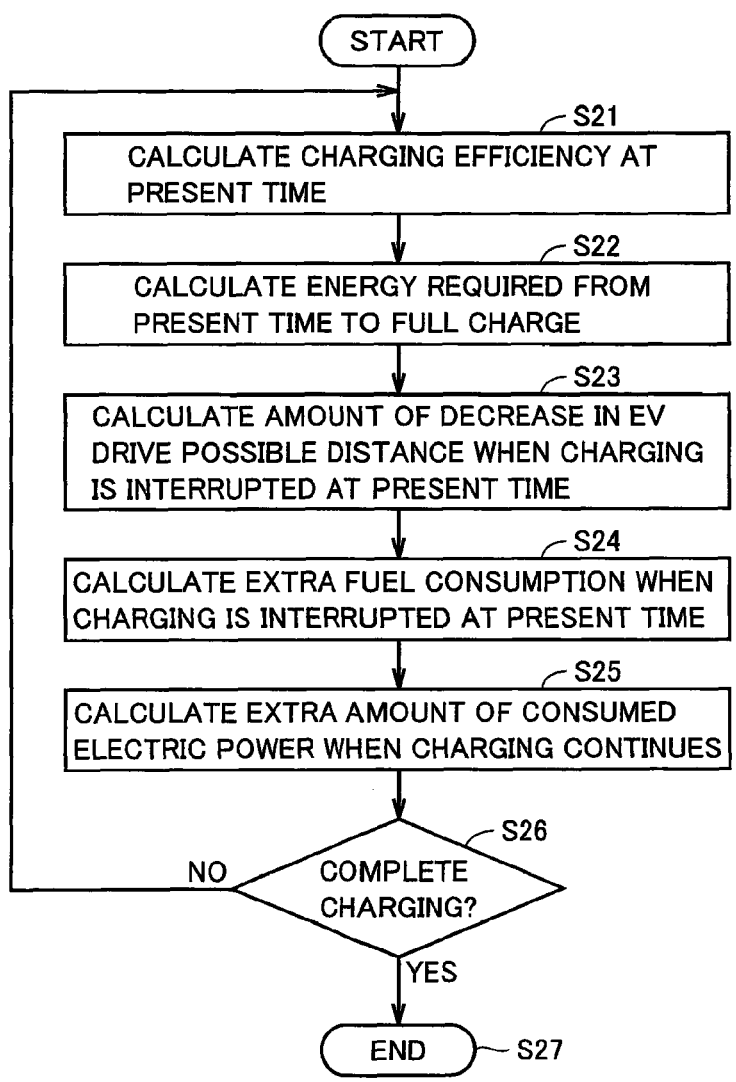
FIG. 8 is a flowchart for describing charging completion determination processing executed in a second embodiment.

FIG. 8 is a flowchart for describing charging completion determination processing executed in the second embodiment.

Although this charging completion determination processing can be used in charging in steps S3, S4 and S5 in FIG. 4, this charging completion determination processing can be used to determine completion of charging in not only the configuration having a plurality of power storage devices as shown in FIG. 1 but also various plug-in hybrid vehicles. Referring to FIG. 8, when the process starts, the charging efficiency at the present time is first calculated in step S21. A charging efficiency K herein is calculated by the following equation:

$$\text{charging efficiency K (\%)} = (\text{charging power})/(\text{supplied power}) \quad (1)$$

The charging power herein refers to electric power fed from charger 42 to the power storage device to be charged, and is calculated based on an output of the voltage sensor for measuring the voltage between terminals of the power storage device and an output of the current sensor for detecting the current flowing in a terminal of the power storage device. In addition, the supplied power refers to electric power input from external power supply 48 to charger 42, and can be obtained based on the outputs of the current sensor and the voltage sensor inside charger 42.

Subsequently to step S21, energy required from the present time to full charge is calculated in step S22. This calculation of the required energy can be made by the following equation (2):

$$\text{energy required for charging} = (\text{battery capacity}) \times (\text{full charge SOC} - \text{present SOC}) \quad (2)$$

The battery capacity herein refers to the capacity of the power storage device to be charged. The full charge SOC herein refers to a threshold value corresponding to full charge at which charging ends. The present SOC herein refers to the present state of charge obtained as a result of integration by the current sensor and the voltage sensor.

Subsequently, in step S23, an amount of decrease in the EV drive possible distance when charging is interrupted at the present time is calculated. This calculation can be made by the following equation (3):

$$\text{amount of decrease in distance (km)} = \text{energy required for charging (Wh)}/\text{EV drive energy consumption (Wh/km)} \quad (3)$$

The energy required for charging is a value calculated in step S22, and the EV drive energy consumption is a value defined depending on the performance of the motor of the vehicle, the weight of the vehicle and the like.

Subsequently, in step S24, an extra amount of consumed fuel when charging is interrupted at the present time is calculated in step S24. This calculation can be made by the following equation (4):

$$\text{amount of consumed fuel (L)} = \text{amount of decrease in distance (km)}/\text{driving fuel efficiency (km/L)} \quad (4)$$

The amount of decrease in distance herein is a value calculated in step S23, and the driving fuel efficiency is a value defined depending on the performance of the engine mounted on the vehicle, the weight of the vehicle and the like.

Subsequently, an extra amount of consumed electric power when charging continues is calculated in step S25. This calculation can be made by the following equation (5):

$$\text{amount of consumed electric power} = \text{energy required for charging} \times (100\% - K)/K \quad (5)$$

The energy required for charging is a value calculated in step S22, and charging efficiency K is a value calculated in step S21.

Subsequently, it is determined in step S26 whether or not to complete charging. A condition for this determination of completion of charging is that the following equation (6) is established.

$$(\text{amount of consumed fuel}) \times (\text{fuel loss coefficient}) < (\text{amount of consumed electric power}) \times (\text{electric power loss coefficient}) \quad (6)$$

If the condition for determination of completion of charging given by equation (6) is not satisfied in step S26, the process returns to step S21 and charging continues. On the other hand, if the condition for determination of completion of charging is satisfied in step S26, the process proceeds to step S27 and charging of the power storage device to be charged is completed.

As described above, in the second embodiment, by calculating the actual charging efficiency whenever necessary and taking into account the actual charging efficiency and the chargeable remaining capacity, it is determined whether to continue charging or to perform hybrid driving using the engine so as not to reduce waste of energy as compared with the case where charging continues, and it is determined when to complete charging.

Finally, the first and second embodiments will be summarized with reference to FIG. 1 and the like. The vehicular charging system according to the first embodiment charges vehicle-mounted power storage devices 10-1, 10-2 and 10-3. This vehicular charging system includes: charger 42 configured to be supplied with electric power from power supply 48 outside the vehicle to charge power storage devices 10-1, 10-2 and 10-3; sensors 14-1 to 14-3 and 16-1 to 16-3 for detecting the states of charge of power storage devices 10-1, 10-2 and 10-3; and charging ECU 46 for controlling charger 42.

Until the states of charge of power storage devices 10-1 to 10-3 reach a predetermined state, charging ECU 46 causes charger 42 to perform quick charging (FIG. 6: t0 to t1). When the states of charge come closer to full charge than the predetermined state, charging ECU 46 causes charger 42 to perform additional charging during which charging progresses more slowly than quick charging (FIGS. 6: t1 to t3). When the state of charge of any one of power storage devices 10-1 to 10-3 reaches a charging stop threshold value during additional charging, charging ECU 46 stops charging of the power storage devices by charger 42 (W1 in FIG. 6). Charging ECU 46 stops charging of the power storage devices by charger 42 when a time of additional charging exceeds predetermined time TL even if the state of charge of the power storage device does not reach the charging stop threshold value.

Preferably, quick charging is CP charging during which charger 42 is controlled such that the charging power is constant, and additional charging is CV charging during which charger 42 is controlled such that the charging voltage supplied to power storage devices 10-1 to 10-3 is constant.

Vehicle 100 includes a vehicle driving motor (motor generator 32-2) operated by receiving electric power from any one of power storage devices 10-1 to 10-3, and engine 36 used together with the motor to drive the vehicle.

The vehicular charging system according to the second embodiment is a vehicular charging system charging vehicle-mounted power storage devices 10-1 to 10-3. This charging system includes: charger 42 configured to be supplied with electric power from power supply 48 outside the vehicle to charge power storage devices 10-1 to 10-3; sensors 14-1 to 14-3 and 16-1 to 16-3 for detecting the states of charge of power storage devices 10-1 to 10-3; and charging ECU 46 for controlling charger 42. Charging ECU 46 stops charging of power storage devices 10-1 to 10-3 from outside the vehicle when a predetermined stop condition is satisfied during charging of any one of power storage devices 10-1 to 10-3 from outside the vehicle. Charging ECU 46 calculates a first value (amount of consumed electric power×electric power loss coefficient) based on the amount of electric energy required to charge the power storage device from the present state of charge to an upper limit value of the state of charge of the power storage device to be charged, in consideration of the charging efficiency of charger 42, and calculates a second value (amount of consumed fuel×fuel loss coefficient) based on the amount of consumed fuel corresponding to the distance that can be traveled using the electric energy required to charge the power storage device from the present state of charge to the upper limit value of the state of charge of the power storage device. The stop condition includes a condition that the first value becomes larger than the second value.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

The invention claimed is:

1. A vehicular charging system charging a vehicle-mounted power storage device, comprising:
    a charger configured to be supplied with electric power from a power supply outside a vehicle to charge said power storage device;
    a sensor for detecting a state of charge of said power storage device; and
    a charging control device programmed to control said charger, wherein
    said charging control device stops charging of said power storage device from outside said vehicle when a predetermined stop condition is satisfied during charging of said power storage device from outside said vehicle,
    said charging control device is programmed to calculate a first value based on an amount of electric energy required to charge said power storage device from a present state of charge to an upper limit value of the state of charge of said power storage device, in consideration of charging efficiency of said charger, and is programmed to calculate a second value based on an amount of consumed fuel corresponding to a distance that can be traveled using the electric energy required to charge said power storage device from said present state of charge to said upper limit value of the state of charge of said power storage device, and
    said stop condition includes a condition that said first value becomes larger than said second value.

2. The vehicular charging system according to claim 1, wherein
    said vehicle includes
    a vehicle driving motor operated by receiving electric power from said power storage device, and
    an internal combustion engine used together with said motor to drive the vehicle.

* * * * *